US011433341B2

(12) United States Patent
Choi et al.

(10) Patent No.: US 11,433,341 B2
(45) Date of Patent: Sep. 6, 2022

(54) FILTER ASSEMBLY AND DRYER FOR THE SAME

(71) Applicant: SAMSUNG ELECTRONICS CO., LTD., Suwon-si (KR)

(72) Inventors: Bokun Choi, Suwon-si (KR); Jeseung Oh, Suwon-si (KR); Heejun Kang, Suwon-si (KR); Eungchan Kim, Suwon-si (KR); Youngmin Jeong, Suwon-si (KR); Hankyu Choi, Suwon-si (KR); Jungsu Ha, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 490 days.

(21) Appl. No.: 16/666,902

(22) Filed: Oct. 29, 2019

(65) Prior Publication Data
US 2020/0129908 A1 Apr. 30, 2020

(30) Foreign Application Priority Data

Oct. 29, 2018 (KR) .................. 10-2018-0129591

(51) Int. Cl.
*B01D 46/00* (2022.01)
*D06F 58/22* (2006.01)
*B01D 46/24* (2006.01)
*B01D 46/64* (2022.01)

(52) U.S. Cl.
CPC ..... *B01D 46/0045* (2013.01); *B01D 46/2414* (2013.01); *B01D 46/64* (2022.01); *D06F 58/22* (2013.01)

(58) Field of Classification Search
None
See application file for complete search history.

(56) References Cited

U.S. PATENT DOCUMENTS

| 8,667,705 | B2 | 3/2014 | Shin et al. |
| 8,789,287 | B2 | 7/2014 | Kim et al. |
| 9,062,410 | B2 | 6/2015 | Ahn et al. |
| 9,702,625 | B2 * | 7/2017 | Kim .................. F26B 21/003 |

(Continued)

FOREIGN PATENT DOCUMENTS

| CN | 107641948 A | 1/2018 |
| EP | 2 682 513 A1 | 1/2014 |

(Continued)

OTHER PUBLICATIONS

Communication dated Jul. 13, 2021, from the European Patent Office in European Application No. 19878900.0.

(Continued)

*Primary Examiner* — Christopher P Jones
*Assistant Examiner* — Brit E. Anbacht
(74) *Attorney, Agent, or Firm* — Sughrue Mion, PLLC

(57) ABSTRACT

A filter assembly includes a primary filter; a secondary filter into which the primary filter is detachably inserted; a case detachably coupled to the primary filter and comprising a plurality of air inlet holes; and at least one blade being rotatably coupled to the secondary filter and configured to compresses first foreign substances collected in the primary filter based on the primary filter moving in a first direction in which the primary filter is drawn out from the secondary filter.

20 Claims, 13 Drawing Sheets

(56) References Cited

U.S. PATENT DOCUMENTS

| | | | | |
|---|---|---|---|---|
| 2003/0154618 A1* | 8/2003 | Treu | ............... | D06F 58/22 34/85 |
| 2007/0108181 A1 | 5/2007 | Gassmann et al. | | |
| 2007/0256317 A1* | 11/2007 | Johnson | ............... | D06F 58/22 34/85 |
| 2008/0196268 A1* | 8/2008 | Jung | ............... | D06F 58/22 34/85 |
| 2011/0016736 A1 | 1/2011 | Kim et al. | | |
| 2011/0154587 A1 | 6/2011 | Kim | | |
| 2018/0135233 A1 | 5/2018 | Lv et al. | | |
| 2019/0351459 A1* | 11/2019 | Dal Molin | ............... | B01D 46/10 |
| 2020/0123697 A1* | 4/2020 | Dal Molin | ............... | D06F 58/22 |

FOREIGN PATENT DOCUMENTS

| | | |
|---|---|---|
| EP | 2 843 123 A1 | 3/2015 |
| EP | 3 031 977 A1 | 6/2016 |
| KR | 10-2002-0062450 A | 7/2002 |
| KR | 10-2011-0075779 A | 7/2011 |
| KR | 10-1153661 B1 | 6/2012 |
| KR | 10-2014-0087555 A | 7/2014 |
| KR | 10-1704420 B1 | 2/2017 |
| KR | 10-1716821 B1 | 3/2017 |
| KR | 10-2018-0011758 A | 2/2018 |
| KR | 10-1832764 B1 | 4/2018 |
| WO | 2011/042345 A1 | 4/2011 |

OTHER PUBLICATIONS

International Search Report (PCT/ISA/210) dated Feb. 20, 2020 issued by the International Searching Authority in International Application No. PCT/KR2019/014294.

Written Opinion (PCT/ISA/237) dated Feb. 20, 2020 issued by the International Searching Authority in International Application No. PCT/KR2019/014294.

* cited by examiner

FILTER ASSEMBLY AND DRYER FOR THE SAME

CROSS-REFERENCE TO RELATED APPLICATION

This application is based on and claims priority under 35 U.S.C. § 119(a) to Korean Patent Application No. 10-2018-0129591 filed on Oct. 29, 2018 in the Korean Intellectual Property Office, the disclosure of which is incorporated herein by reference in its entirety.

BACKGROUND

1. Field

The disclosure relates to a filter assembly and a dryer including the same, and more particularly, to a filter assembly for filtering lint that is generated in the process of drying clothes, thin blankets, towels, etc. in a drum, and a dryer including the same.

2. Description of Related Art

In the related art, a clothes dryer is an apparatus which dries wet washed laundry with dry air.

Clothes dryers are classified into gas-type dryers and electricity-type dryers according to the type of power sources, and are also classified into exhaust-type dryers and condensation-type dryers according to methods of processing humidity absorbed from the clothes being dried. An exhaust-type dryer discharges humid air flowing from a drum of the dryer to the outside through an exhaust duct. A condensation-type dryer uses a method of removing moisture in the air flowing from a drum of the dryer, drying the moisture in the air through a heat exchange apparatus, and sending the dried air back to the drum again to circulate it. As the flow of air forms a closed loop, it is difficult to use gas as a heat source and electricity is mainly used. Accordingly, the cost for maintenance is relatively high. However, as the air is capable of circulating between a drum and a heat exchange apparatus in the dryer, there is an advantage omitting the exhaust duct, and thus installation is simpler.

Meanwhile, when wet clothes are put inside a drum of the dryer and drying proceeds, lint is generated. The lint moves along a flow path together with air and then may stick to a heat exchange apparatus inside a condensation-type dryer. Accordingly, in the related art, a filter for filtering the lint is installed in a flow path on the inlet side of a heat exchange apparatus to collect the lint to keep the lint away from the heat exchange apparatus.

As the lint keeps getting accumulated in the filter, the flow of air gets impeded, and accordingly, heat exchange efficiency of the heat exchange apparatus deteriorates, and consequently, the performance of the dryer deteriorates. Thus, for preventing the above-described deterioration, a user has to clean the filter regularly.

In a clothes dryer of the related art, an air flow path, which is connected to a drum so as to supply air to the inside of a drum arranged on the inner side of the main body of the clothes dryer and to guide the air discharged from the drum, is provided. Also, a clothes dryer of the related art includes a dehumidification unit arranged in the air flow path so as to condense the moisture included in the air discharged from the drum, a water trap that collects condensed water generated by the dehumidification unit, a filter for filtering the lint included in the air discharged from the drum, and a water container for storing the water returned from the water trap.

When drying clothes by using a clothes dryer of the related art, in order for preventing re-entry of lint to the drum or mitigating the deterioration of heat exchange efficiency due to the lint, the filter should be cleaned so that the lint collected in every operation of the dryer is removed from the filter. In this case, a user has to separate the filter from the dryer and remove the collected lint through an appropriate method, and this repetitive filter cleaning operation causes inconvenience to the user.

In particular, in case a dryer should be used immediately, cleaning the filter may cause inconvenience in continuous drying operations, and in a method of cleaning the filter, there is also inconvenience of having to remove the collected lint by hand and having to clean the filter with water. In addition, arsenic acid in the lint that is generated while cleaning the filter may also act as inconvenience to a user in a clothes drying operation wherein cleanliness is considered important.

SUMMARY

The purpose of the disclosure is in suggesting a structure of a dryer filter for compression of the collected lint, and through this compression, providing a filter assembly by which a user can minimize the number of times of discharging the lint collected in the filter assembly without deteriorating the performance of the dryer, and can simply perform cleaning of the filter assembly by compressing the collected lint, and a dryer including the same.

In accordance with an aspect of the disclosure, an embodiment provides a filter assembly including a primary filter; a secondary filter into which the primary filter is detachably inserted; a case detachably coupled to the primary filter and including a plurality of air inlet holes; and at least one blade being rotatably coupled to the secondary filter and configured to compresses first foreign substances collected in the primary filter based on the primary filter moving in a first direction in which the primary filter is drawn out from the secondary filter.

The at least one blade may be changed from a first position to a second position as the primary filter moves in the first direction, and is changed back to the first position from the second position as the primary filter moves in a second direction opposite to the first direction, the at least one blade not being in contact with an inner side of the primary filter at the first position and being in contact with the inner side of the primary filter at the second position.

The primary filter may include a pair of guide grooves extending in the second direction and provided at opposite axial ends of the at least one blade, pair of guide grooves not interfering with the at least one blade while the at least one blade moves in the first direction or the second direction; and a tier formed on one of the pair of guide grooves. The at least one blade may include: a pair of main blades in contact with a first surface of the primary filter and a second surface opposite to the first surface of the primary filter when the at least one blade is in the second position; and an operation projection configured to rotate in one direction by the tier formed on the one of the pair of guide grooves by movement of the primary filter.

The at least one blade may be configured to maintain the second position by one side of the operation projection being supported by the one of the pair of guide grooves based on the operation projection being inserted into the pair of guide grooves.

A center of gravity of the at least one blade may be deviated to one blade of the pair of main blades such that a position of the at least one blade is changed from the second position to the first position.

The one blade of the pair of main blades may include a weight being embedded in the one blade of the pair of main blades.

The pair of main blades may include a rubber material or synthetic resin having elasticity.

The primary filter further may include a pair of sub blades being in contact with a first side surface and a second side surface of the secondary filter and configured to scrape off second foreign substances collected in the secondary filter based on the primary filter moving in the second direction.

The pair of sub blades may include a rubber material or synthetic resin having elasticity.

A top surface of each of the pair of sub blades may include a coating layer configured to prevent friction between the pair of sub blades and the second filter.

The second filter may include a lower space configured to collect the second foreign substances.

The secondary filter may further include a discharge door configured to discharge foreign substances collected in the lower space.

The at least one blade may include: a rotation center axis; a first blade and a second blade extending along the rotation center axis; and an operation projection protruding in a different direction from extending directions of the first and second blades from the rotation center axis.

The first blade and the second blade may be arranged symmetrically with respect to the rotation center axis.

The first blade and the second blade may be arranged in parallel with each other. The operation projection protrudes in an orthogonal direction with respect to the first blade and the second blade.

In accordance with an aspect of the disclosure, an embodiment provides a filter assembly including a primary filter configured to filter air introduced into an opening and discharged to a first side surface and a second side surface of the primary filter; a secondary filter to which the primary filter is slidably coupled in a first direction and from which the primary filter is slidably uncoupled in a second direction opposite to the first direction, the secondary filter configured to filter air introduced from the primary filter and discharged to a first side surface and a second side surface of the secondary filter; and at least one blade configured to rotate in a first rotation direction as the primary filter moves in the second direction and scrape off first foreign substances collected on the first side surface and the second side surface of the primary filter and compresses the first foreign substances.

The at least one blade may be configured to rotate in a second rotation direction opposite to the first rotation direction as the primary filter moves in the first direction.

The filter assembly may further include a pair of sub blades attached on the first side surface and the second side surface of the primary filter. The pair of sub blades are configured to scrape off second foreign substances collected on the first side surface and the second side surface of the secondary filter and collect the second foreign substances based on the primary filter moving in the first direction.

In accordance with an aspect of the disclosure, an embodiment provides a filter assembly including a primary filter including a first plurality of holes configured to filter first foreign substances from air introduced into the primary filter; a secondary filter including a second plurality of holes configured to filter second foreign substances from air passed through the primary filter, the primary filter being slidably inserted into the secondary filter in a first direction and slidably drawn out from the secondary filter in a second direction opposite to the first direction, and at least one blade configured to rotate between a first position and a second position, the at least one blade not being in contact with an inner side of the primary filter at the first position and being in contact with the inner side of the primary filter at the second position. The at least one blade may be configured to scrape off the first foreign substances collected on the inner side the primary filter and configured to compress the first foreign substances in the primary filter Also, the disclosure may achieve the aforementioned purpose by providing a dryer including a main body including a drum arranged on the inner side, a slot for putting clothes inside the drum, and a door closing and opening the slot, and a filter assembly as described above which is separably installed on the slot and filters foreign substances included in air discharged from the inside of the drum.

As described above, according to the various embodiments of the disclosure, the number of times of cleaning a filter assembly can be reduced compared to the filters of the related art without deteriorating the performance of a dryer, and cleaning of a filter assembly can be performed easily by compressing the lint collected inside the filter assembly.

BRIEF DESCRIPTION OF THE DRAWINGS

The above and/or other aspects, features, and advantages of embodiments of the disclosure will be more apparent from the following description taken in conjunction with the accompanying drawings, in which.

DETAILED DESCRIPTION

Figure 1:
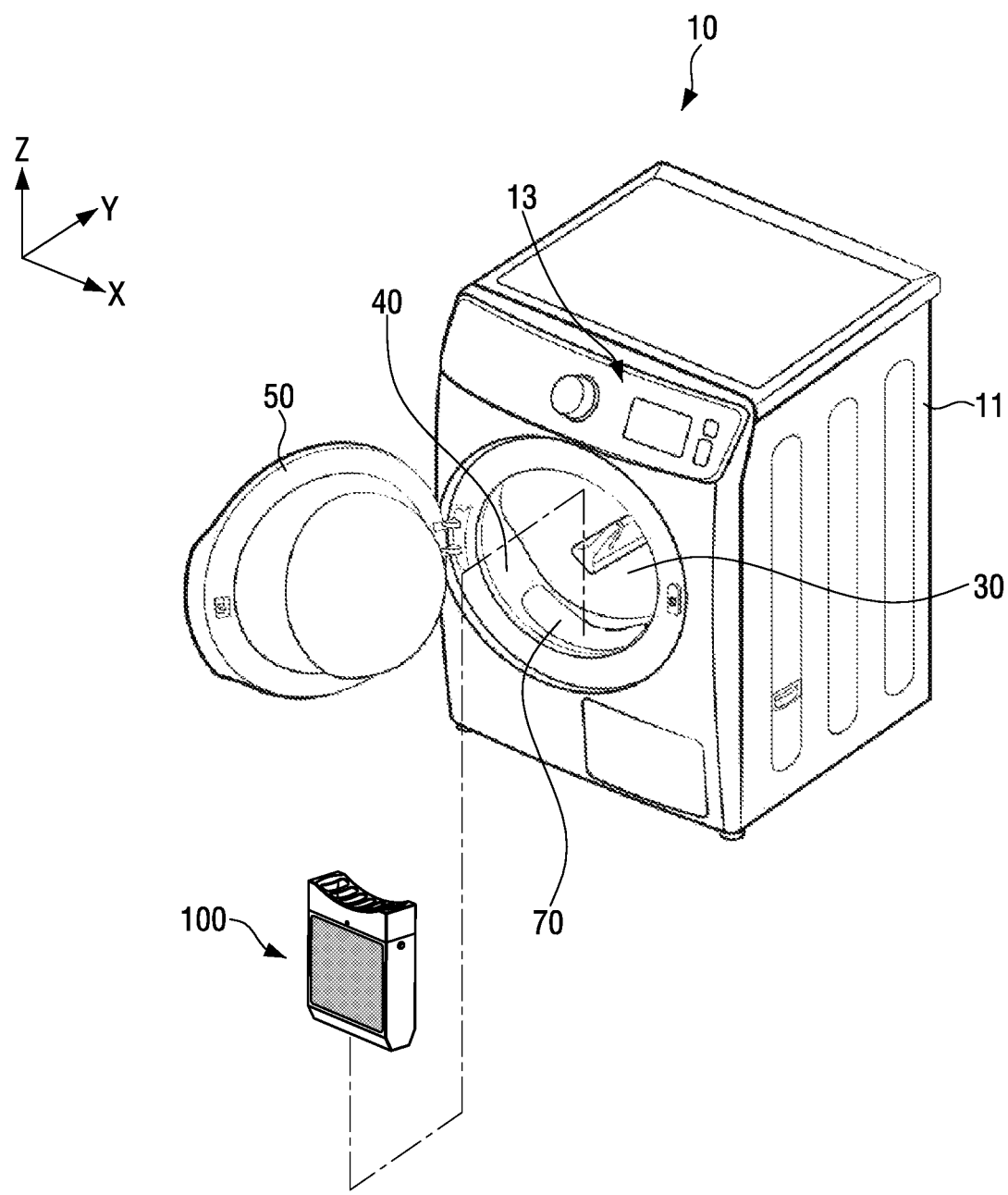
FIG. 1 is a perspective view illustrating a clothes dryer including a filter assembly according to an embodiment of the disclosure.

In explaining the disclosure, in case it is determined that detailed explanation of related known technologies may unnecessarily confuse the gist of the disclosure, the detailed explanation will be omitted. Also, overlapping explanation for the same components will be omitted as much as possible.

Meanwhile, the suffix "part" for components used in the following description is provided or interchangeably used in consideration of only easiness of drafting the specification, and does not have meaning or a role of itself distinguishing it from other components.

Terms used in the disclosure are used to explain embodiments, and are not intended to restrict and/or limit the disclosure. Also, singular expressions include plural expressions, unless defined obviously differently in the context.

Also, in the disclosure, terms such as 'include' and 'have/has' should be construed as designating that there are such characteristics, numbers, steps, operations, elements, components or a combination thereof described in the specification, but not to exclude the existence or possibility of adding one or more of other characteristics, numbers, steps, operations, elements, components or a combination thereof.

The expressions "first," "second" and the like used in the disclosure may be used to describe various elements regardless of any order and/or degree of importance. Also, such expressions are used only to distinguish one element from another element, and are not intended to limit the elements.

The description in the disclosure that one element (e.g.: a first element) is "(operatively or communicatively) coupled with/to" or "connected to" another element (e.g.: a second element) should be interpreted to include both the case where the one element is directly coupled to the another element, and the case where the one element is coupled to the another element through still another element (e.g.: a third element). In contrast, the description that one element (e.g.: a first element) is "directly coupled" or "directly connected" to another element (e.g.: a second element) can be interpreted to mean that still another element (e.g.: a third element) does not exist between the one element and the another element.

The filter assembly according to the disclosure may filter foreign substances (e.g., lint) included in air discharged from the inside of a drum. In this case, the air discharged from the inside of a drum may be introduced inside a primary filter through a case coupled to an opening in the upper part of the primary filter, and then pass through the primary filter, and be discharged from a filter assembly through a secondary filter.

In a filter assembly provided on a dryer according to the disclosure, a primary filter may be separably or detachably inserted into the inside of a secondary filter such that second filtering is possible. The filter assembly filters the lint that are generated in a process of drying clothes inside a drum of the dryer. Also, the filter assembly according to the disclosure may filter various foreign substances separated from clothes other than lint. In the disclosure, a dryer is not limited to drying clothes, but may dry laundry in various forms washed in a washing machine such as a thin blanket or a towel, etc.

The filter assembly according to the disclosure may scrape off lint collected on the inside of a primary filter by an operation of pulling the primary filter separably or detachably inserted into a secondary filter in a direction of drawing the primary filter from the secondary filter and collect the lint in the lower part of the primary filter, and at the same time, compress the collected lint. In this case, it is possible to clean the primary filter without separating the filter assembly from the dryer.

After the primary filter is pulled in a direction of drawing the primary filter to the secondary filter and the primary filter is cleaned, and the primary filter is pushed in a direction of inserting the primary filter into the secondary filter again, the filter assembly according to the disclosure may scrape off lint collected on the inside of the secondary filter and collect the lint in the lower part of the secondary filter.

The filter assembly according to the disclosure may clean the primary filter and the secondary filter respectively by a simple operation of just drawing the primary filter from the secondary filter and moving the primary filter in a direction of inserting the primary filter into the secondary filter without having to be separated from the dryer when cleaning the primary and secondary filters. Accordingly, inconvenience of having to clean the filter assembly regularly can be avoided.

Hereinafter, various embodiments of the disclosure will be described in detail with reference to the accompanying drawings.

FIG. 1 is a perspective view illustrating a filter assembly 100 and a clothes dryer 10 including the same according to an embodiment of the disclosure.

Referring to FIG. 1, a clothes dryer 10 according to an embodiment of the disclosure may include a main body 11, and a drum 30 rotatably arranged on the inside of the main body 11 for drying, for example, clothes.

The main body 11 may include a manipulation part 13 provided with a plurality of switches or controls and a display panel for manipulating power-on/power-off and drying operations, and a slot 40 for putting or drawing clothes inside/from the drum 30 may be formed on one side. Also, the main body 11 may include a door 50 that is hinge-coupled so as to open and close the slot 40.

On the slot 40, a mounting groove 70 on which the filter assembly 100 for filtering the foreign substance (e.g., lint) included in the air discharged from the drum 30 is detachably mounted may be formed. The mounting groove 70 may be located on the lower end of the slot 40, and may be connected with a predetermined exhaust duct for discharging air that passed through the filter assembly 100.

The upper end of the filter assembly 100 (the top surface of the case 170 shown in FIG. 2) may be formed to have a predetermined curvature so as to correspond to a partial shape of the slot 40, so that clothes are not interfered by the filter assembly 100 when clothes are put inside or drawn out from the drum through the slot 40.

The filter assembly 100 collects lint generated from the clothes or the like in the drum 30 when a drying operation is performed at the drum 30. Air including the lint exhausted from the drum 30 may be introduced inside the filter assembly 100 through the upper end of the filter assembly 100 and go through a dual filtering process, and then be transmitted to a condenser provided inside the dryer 10 through an exhaust duct. In this case, the condenser may remove moist included in the air, and make the air flow inside the drum 30 of the dryer again.

Figure 2:
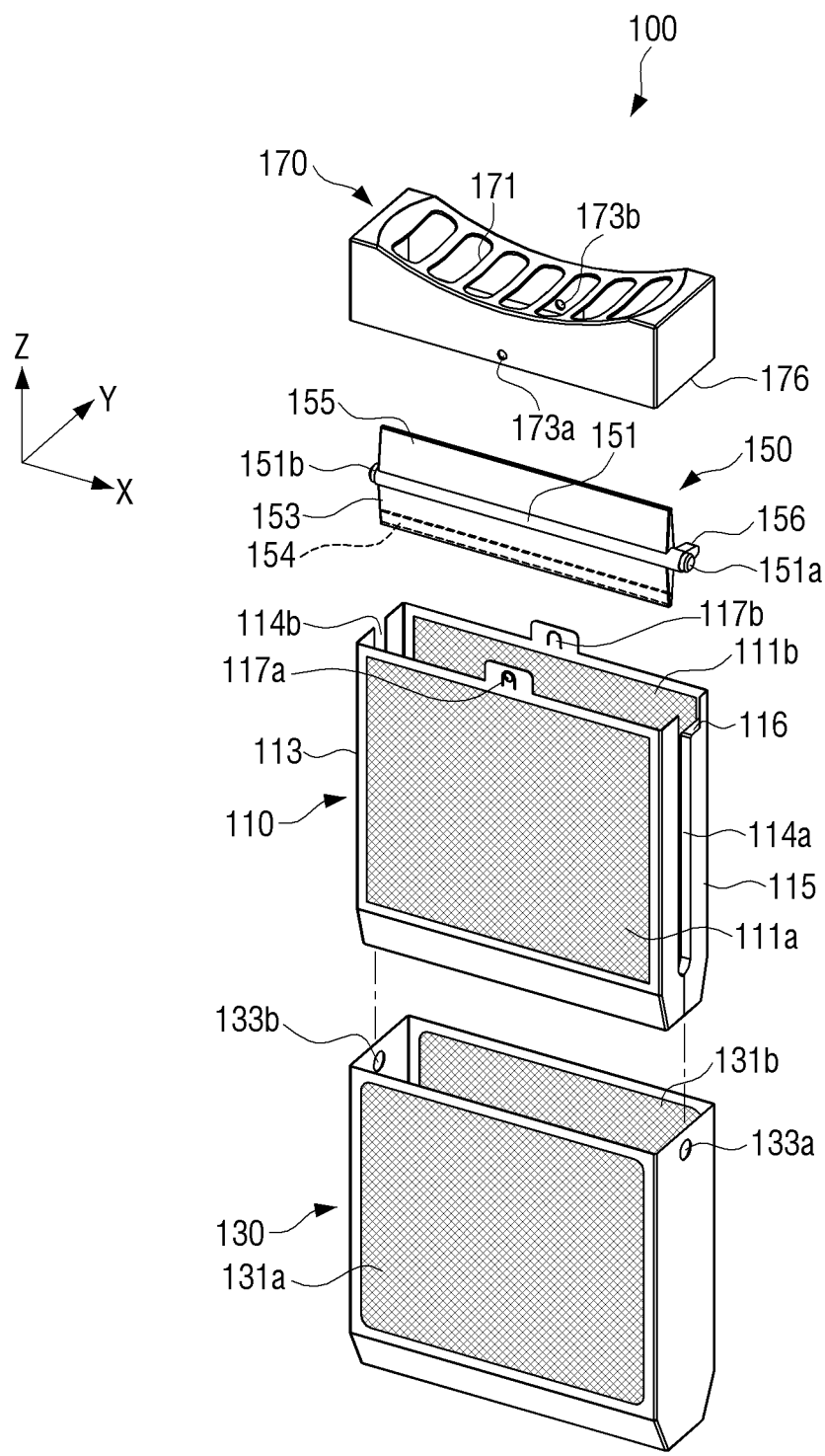
FIG. 2 is an exploded perspective view illustrating a filter assembly according to an embodiment of the disclosure.
Figure 3:
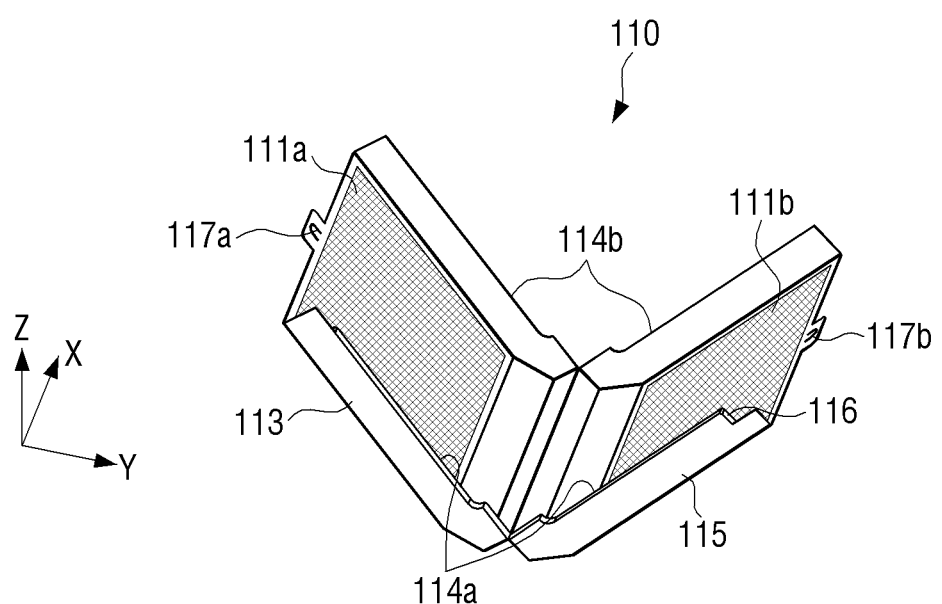
FIG. 3 is a perspective view illustrating a primary filter of a filter assembly according to an embodiment of the disclosure.
Figure 4:
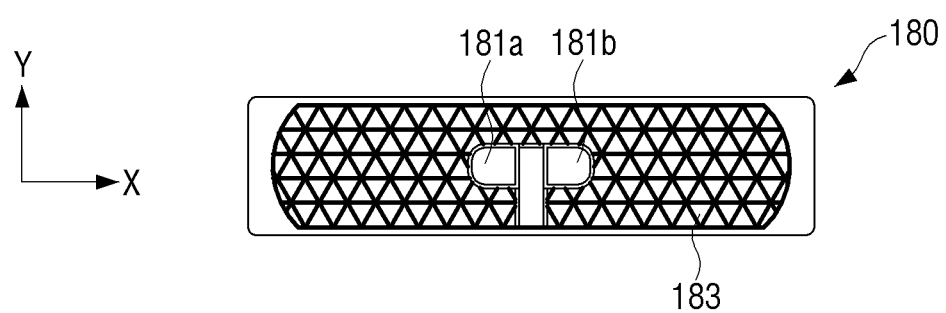
FIG. 4 is a plan view illustrating another example of a case of a filter assembly according to an embodiment of the disclosure.

Hereinafter, the structure of a filter assembly 100 according to an embodiment of the disclosure will be described with reference to the drawings. FIG. 2 is an exploded perspective view illustrating a filter assembly 100 according to an embodiment of the disclosure. FIG. 3 is a perspective view illustrating a primary filter 110 of a filter assembly 100 according to an embodiment of the disclosure. FIG. 4 is a plan view illustrating an example of a case 170 of a filter assembly 100 according to an embodiment of the disclosure.

Referring to FIG. 2, the filter assembly 100 may include a primary filter 110, a secondary filter 130 into which the primary filter 110 is inserted, a compression member 150 (or at least one blade 150) coupled to the secondary filter 130, and a case 170 coupled to the primary filter 110.

On the primary filter 110, an opening for introduction of air may be provided in the upper part, and based on FIG. 2, a pair of first meshes 111a, 111b respectively having a plurality of fine holes may be coupled to the front surface and the rear surface (the Y axis direction) of the primary filter 110.

On the secondary filter 130, an opening into which the primary filter 110 can be inserted may be provided in the upper part, and like in the case of the primary filter 110, a pair of second meshes 131a, 131b respectively having a plurality of fine holes may be coupled to the front surface and the rear surface (the Y axis direction) of the secondary filter 130.

Also, in case the primary filter 110 is inserted into the secondary filter 130, the pair of first meshes 111a, 111b of the primary filter 110 respectively face the pair of second meshes 131a, 131b of the secondary filter 130. In this case, the sizes of the fine holes of the second meshes 131a, 131b of the secondary filter 130 may be manufactured to be the same as the sizes of the fine holes of the pair of first meshes 111a, 111b of the primary filter 110.

Alternatively, the sizes of the fine holes of the pair of second meshes 131a, 131b of the secondary filter 130 may be manufactured to be smaller than the sizes of the fine holes of the pair of first meshes 111a, 111b of the primary filter 110, and through this, fine lint or foreign substances that were not filtered at the pair of first meshes 111a, 111b of the primary filter 110 may be collected at the pair of second meshes 131a, 131b of the secondary filter 130 by stages, and filtering efficiency may thereby be improved.

It is preferable that the sizes of the fine holes of the pair of first meshes 111a, 111b and the pair of second meshes 131a, 131b as described above are determined based on the flow of air as well as the loss of pressure inside the dryer 10.

Referring to FIG. 3, the primary filter 110 may include first and second parts 113, 115 so that the top side of the primary filter 110 can open and shut with respect to a hinge 119 (refer to FIG. 5A) provided on the lower end as the center. In this case, there may be one or more hinges 119 that connect the first and second parts 113, 115 to be able to rotate with respect to each other. Under such a structure, a user can easily separate and remove the lint collected in the primary filter 110, and can also easily clean the primary filter 110.

Also, on the primary filter 110, a pair of guide grooves 114a, 114b may be formed along the longitudinal direction of the primary filter 110 on the left side and right side surfaces (the X axis direction in FIG. 2) of the primary filter 110. The pair of guide grooves 114a, 114b make the primary filter 110 not being interfered by the compression member 150 coupled to the secondary filter 130 so that the primary filter 110 can move freely in the Z axis direction (i.e., in and out of the secondary filter 130). As described above, the primary filter 110 can move along the Z axis direction while being inserted into the secondary filter 130 through the pair of guide grooves 114a, 114b. Accordingly, the primary filter 110 can be cleaned by the movement of the primary filter 110 in the Z axis direction and the compression member 150 while the filter assembly 100 is not separated from the mounting groove 70 of the dryer.

On the upper end of one guide groove 114a between the pair of guide grooves, a tier 116 may be formed. The tier 116 may engage with the compression member 150 while being interlocked with an operation of moving the primary filter 110 in the direction of being drawn out from the secondary filter 130 (i.e., in the +Z axis direction). The structure and operation of the compression member 150 will be described in detail below.

Referring to FIG. 2, to the opening of the primary filter 110 (an opened portion in the upper part), the case 170 may be separably coupled. For a snap coupling between the primary filter 110 and the case 170, a pair of coupling projections 117a, 117b may be formed on the upper ends of the front surface and the rear surface of the primary filter 110, and on the lower ends of the front surface and the rear surface of the case 170, a pair of coupling holes 173a, 173b to which the pair of coupling projections 117a, 117b may be formed for the snap coupling between the primary filter 110 and the case 17.

In the upper part of the case 170, a plurality of air inlet holes 171 may be formed such that air discharged from the drum 30 is introduced inside the primary filter 110. The plurality of air inlet holes 171 may not only be used as a passage through which air is discharged from the drum 30, but the plurality of air inlet holes 171 may also be used in moving the primary filter 110 in the direction of being drawn out from or inserted into the secondary filter 130 (in the Z axis direction). In this case, a user may move the primary filter 110 in the Z axis direction while putting a finger into the air inlet holes 171 and gripping the case 170. However, the embodiment is not limited thereto.

The plurality of air inlet holes 171 formed on the case 170 may be formed in shapes that can grip the case 170 more easily for the movement of the primary filter 110. For example, as illustrated in FIG. 4, it is possible that two large air inlet holes 181a, 181b are formed in the center of the top surface of the case 180, and a plurality of small air inlet holes 183 that are smaller than the large air inlet holes 181a, 181b are formed around the two large air inlet holes 181a, 181b.

The compression member 150 may collect and compress the lint collected at the pair of first meshes 111a, 111b of the primary filter 110 as the primary filter 110 moves in the direction of being drawn out from the secondary filter 130 (+Z axis direction).

For performing such a function, the compression member 150 may be rotatably coupled to the secondary filter 130. For this, a pair of hinge projections 151a, 151b may be formed on both ends of the compression member 150 (in the X axis direction), and in the upper parts of the left side and right side surfaces of the secondary filter 130 (parts adjacent to the opening of the secondary filter 130), a pair of hinge holes 133a, 133b to which the pair of hinge projections 151a, 151b are rotatably coupled may be formed.

The compression member 150 may include a pair of main blades 153, 155 that are symmetrically formed approximately in parallel along the longitudinal direction of the compression member 150.

Figure 5A:
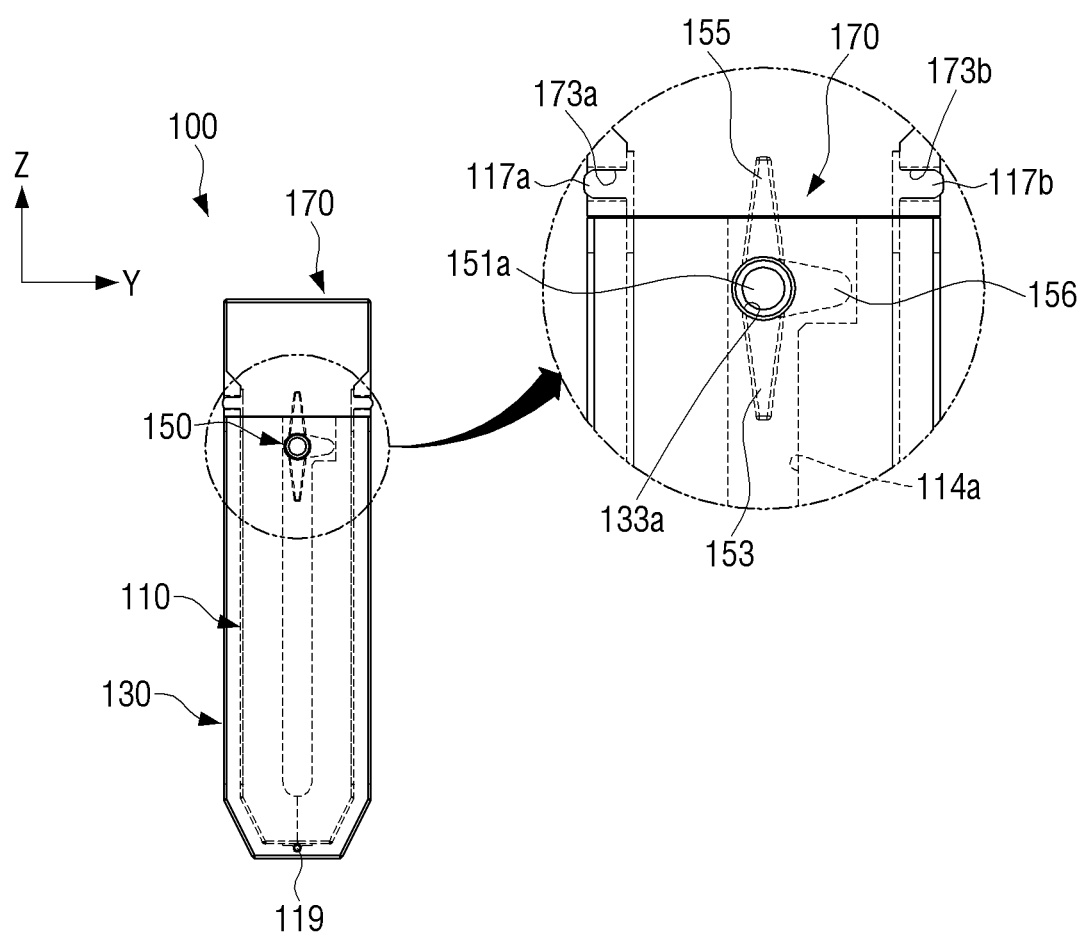
FIG. 5A is a diagram sequentially illustrating an example of collecting and compressing lint collected in a primary filter.
Figure 5B:
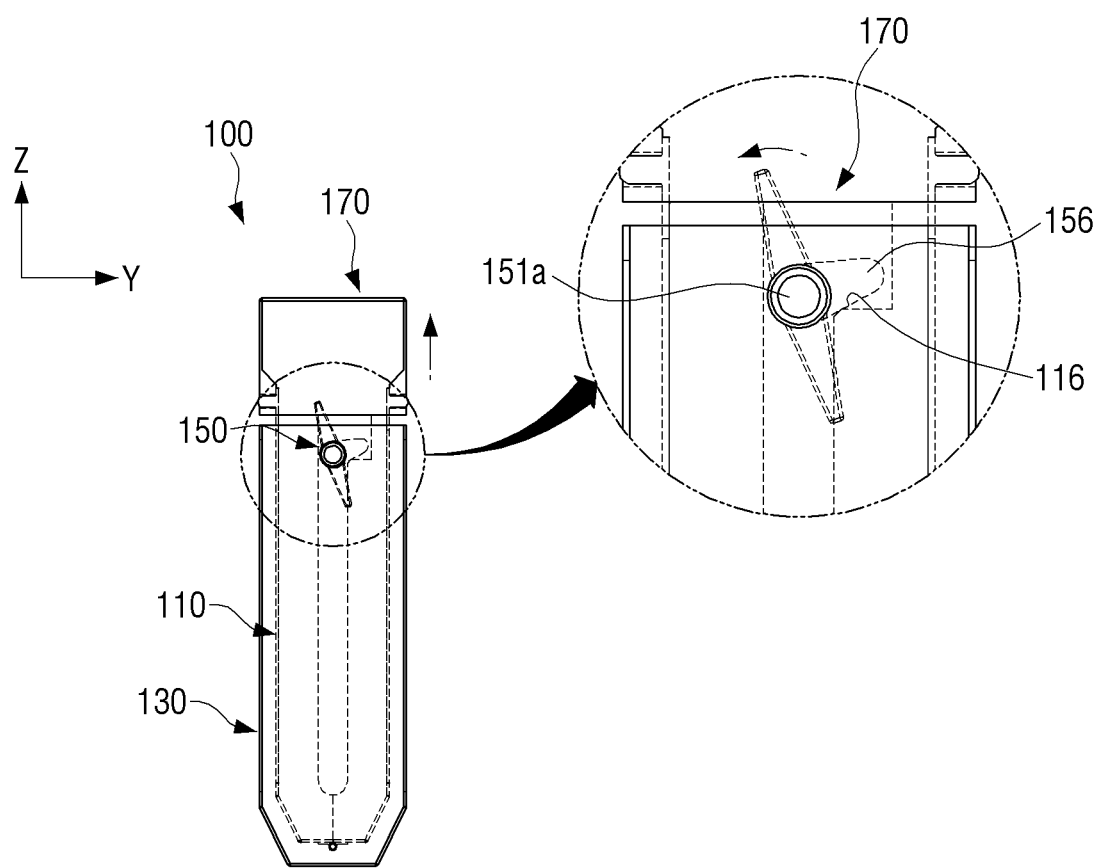
FIG. 5B is a diagram sequentially illustrating an example of collecting and compressing lint collected in a primary filter.
Figure 5C:
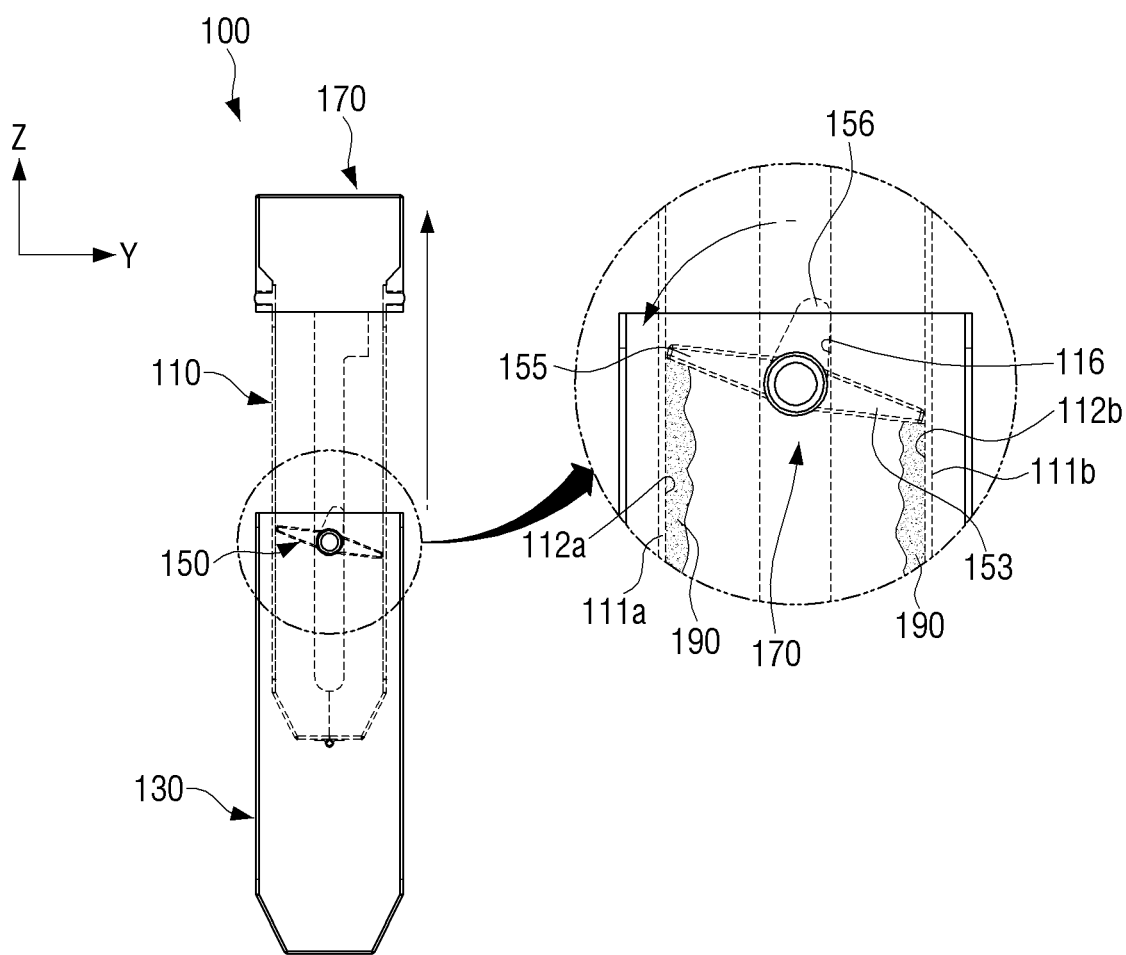
FIG. 5C is a diagram sequentially illustrating an example of collecting and compressing lint collected in a primary filter.

The pair of main blades 153, 155 may be arranged up and down such that the pair of main blades 153, 155 are not in contact with the pair of first meshes 111a, 111b of the primary filter 110 when the compression member 150 is rotated in a first position (refer to FIG. 5A), and may be arranged in a state of being almost horizontal such that the pair of main blades 153, 155 are in contact with the pair of first meshes 111a, 111b of the primary filter 110 when the compression member 150 is rotated in a second position (refer to FIG. 5C).

Also, the pair of main blades 153, 155 may be arranged approximately in parallel along the longitudinal direction of a rotation center axis 151 formed of a predetermined length. In addition, the pair of main blades 153, 155 may be symmetrically arranged with the rotation center axis 151 as the center. Such arrangement of the pair of main blades 153, 155 is considered such that the lint collected at the pair of first meshes 111a, 111b of the primary filter 110 can be scraped off while the pair of main blades 153, 155 are in the second position.

The width of the pair of main blades 153, 155 may be sufficient if the width is a width that can make the end parts of the pair of main blades 153, 155 scrape off the lint 190 collected on the inner side surfaces 112a, 112b (refer to FIG. 5C) of the pair of first meshes 111a, 111b in the second position when the primary filter 110 moves in the direction of being drawn out of the secondary filter 130 (the +Z axis direction). In this case, the pair of main blades 153, 155 may be formed of a rubber material or synthetic resin that can have elasticity and frictional force so as to scrape off the lint 190 effectively.

The compression member 150 may rotate in a direction (i.e., a first direction) and be changed from the first position to the second position, and may rotate in a reverse direction (i.e., a second direction opposite to the first direction) and be changed from the second position to the first position.

Also, the compression member 150 may include an operation projection 156 capable of being engaged with the tier 116 of the primary filter 110 in a location adjacent to the hinge projection 151a for rotating from the first position to the second position.

Figure 5D:
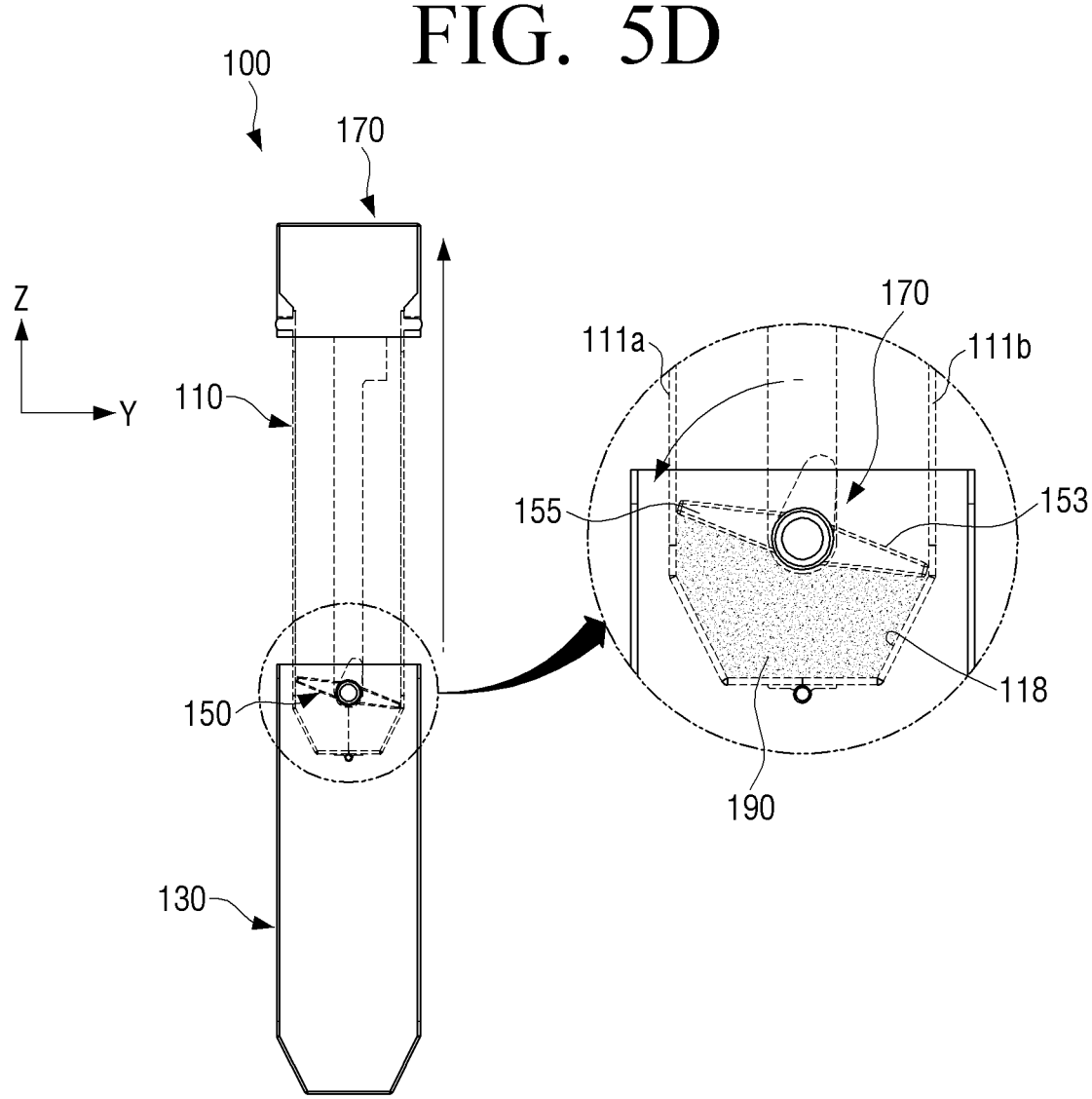
FIG. 5D is a diagram sequentially illustrating an example of collecting and compressing lint collected in a primary filter.

After the operation projection 156 is pushed by the tier 116 (based on the movement of the primary filter 110), the operation projection 156 may rotate in a direction when the primary filter 110 keeps moving in the +Z axis direction and one side of the operation projection 156 may be supported by the inner side surface of the guide groove 114a (refer to FIG. 5C), and each end part of the pair of main blades 153, 155 may contact the inner sides of the pair of first meshes 111a, 111b, respectively. Accordingly, the lint 190 collected on the inner sides of the first meshes 111a, 111b may be collected and compressed in the lower space 118 of the primary filter 110 as shown in FIG. 5D.

Also, when the primary filter 110 moves in the −Z axis direction and moves to a location wherein the primary filter 110 is fully inserted into the secondary filter 130, the upper side of the operation projection 156 is pushed to the lower end 176 (FIG. 2) of the case 170, and accordingly, the compression member 150 may rotate in a reverse direction and be changed from the second position back to the first position.

Meanwhile, on the compression member 150, a pair of main blades 153, 155 may be arranged up and down by the flow of air introduced inside the primary filter 110 through the plurality of air inlet holes 171 of the case 170 during a drying process of the dryer 10, and the first position may thereby be maintained naturally.

Also, in case the gravity center is arranged to be deviated to the side of one main blade 153, 155, the first position of the compression member 150 may be maintained even when there is no flow of air inside the dryer. For this, a weight 154 (FIG. 2) may be embedded in one main blade 153 between the pair of main blades.

Hereinafter, the structure of the filter assembly 100 according to an embodiment of the disclosure will be described with reference to the accompanying drawings. FIGS. 5A to 5D are diagrams sequentially illustrating an example of collecting and compressing the lint 190 collected in a primary filter 110.

Referring to FIG. 5A, during a drying process of the clothes dryer 10, the compression member 150 may be maintained in the first position (i.e., in a vertical direction) by the flow of air introduced into the filter assembly 100 from the drum 30.

After a drying process is completed or while the dryer 10 is not operating, the door 50 of the clothes dryer 10 is opened before cleaning the filter assembly 100.

Referring to FIG. 5B, a user puts, for example, a finger (or two) in the plurality of air inlet holes 171 of the case 170 and pulls the case 170 in the vertical direction (i.e., in the +Z axis direction) for cleaning the filter assembly 100. Here, the primary filter 110 moves in the direction of being drawn out from the secondary filter 130 and the tier 116 engages with one side of the operation projection 156 of the compression member 150. Accordingly, the compression member 150 starts rotating in a direction (the counterclockwise direction in FIG. 5B).

Referring to FIG. 5C, as the case 170 is kept being pulled in the vertical direction (i.e., in the +Z axis direction), the primary filter 110 gets to move in the +Z axis direction together with the case 170. Here, the operation projection 156 is being pushed by the tier 116 of the primary filter 110 and is inserted into the guide groove 114a, and the compression member 150 keeps rotating until being changed to the second position (FIG. 5C) from the first position (FIG. 5A).

As one side (the right side in FIG. 5C) of the operation projection 156 is supported by the inner side surface of the guide groove 114a, the compression member 150 maintains the second position. In the second position, each end part of the pair of main blades 153, 155 contacts the inner side surfaces 112a, 112b of the pair of first meshes 111a, 111b.

While the primary filter 110 moves in the vertical direction (i.e., in the +Z axis direction), each end part of the pair of main blades 153, 155 scrapes off the lint 190 collected on the inner side surfaces 112a, 112b of the pair of first meshes 111a, 111b.

Referring to FIG. 5D, the lint 190 separated from the inner side surfaces 112a, 112b of the pair of first meshes 111a, 111b by the pair of blades 153, 155 are collected in the lower space 118 of the primary filter 110 as the primary filter 110 moves in the vertical direction (i.e., in the +Z axis direction).

In this case, when the primary filter 110 is moved to the maximum height location on the +Z axis, the lint 190 collected in the lower space 118 of the primary filter 110 are pressurized by the pair of blades 153, 155 and are compressed.

When cleaning of the primary filter 110 is completed, the case 170 is pushed in the −Z axis direction and the primary filter 110 is moved down to its original position. Here, from the location wherein the operation projection 156 starts to be separated from the guide groove 114a, the upper side of the operation projection 156 is pushed to the lower end 176 of the case 170, and the compression member 150 rotates in a reverse direction (in the clockwise direction) and is changed back to the first position.

The collected amount of lint collected in the pair of second meshes 131a, 131b of the secondary filter 130 is smaller than the collected amount of lint collected in the primary filter 110. Accordingly, even if only the primary filter 110 is cleaned, no big influence is exerted on the performance of the dryer.

Meanwhile, the aforementioned filter assembly 100 according to an embodiment of the disclosure may clean the primary filter 110 in a state of not being separated from the dryer 10. However, the filter assembly 100a according to another embodiment of the disclosure that will be described below may clean not only the primary filter 110 but also the secondary filter 130 without being separated from the dryer 10.

Figure 6:
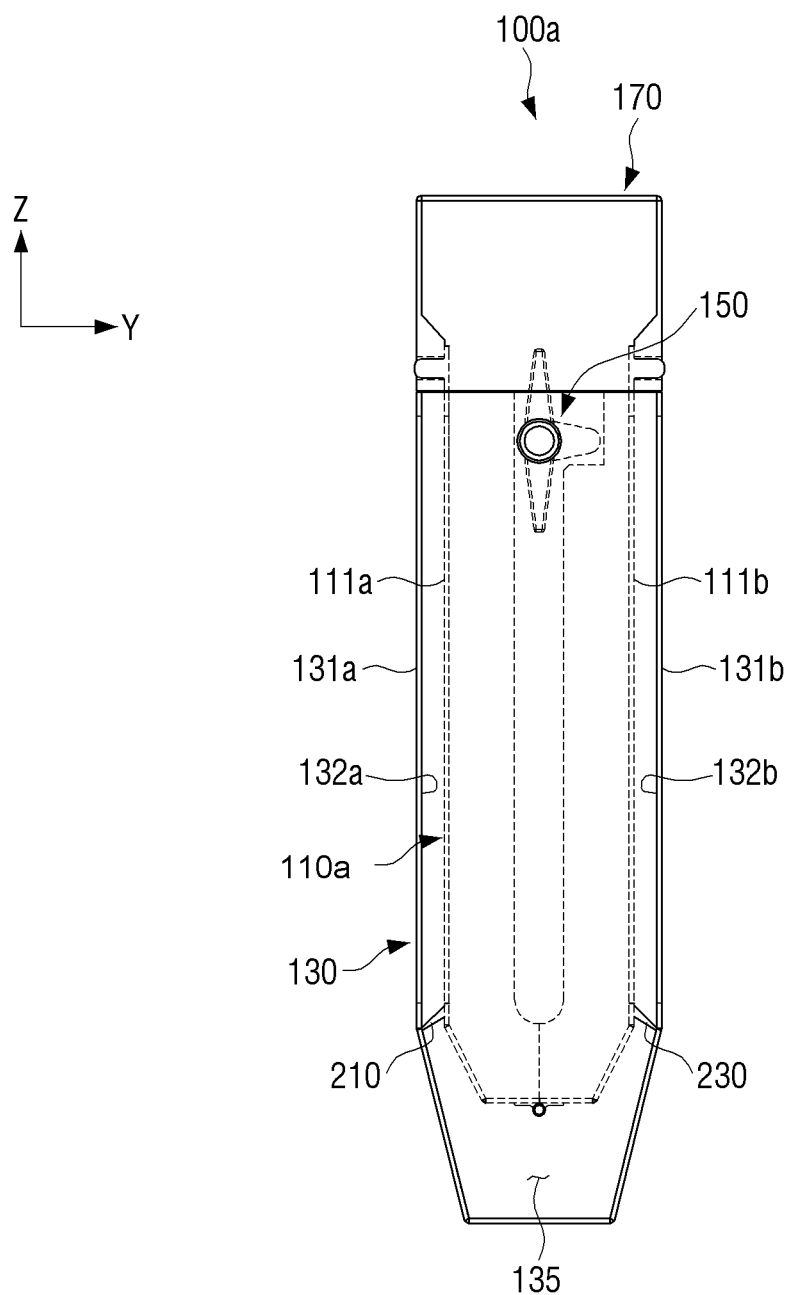
FIG. 6 is a cross-sectional view illustrating a filter assembly according to another embodiment of the disclosure.
Figure 7A:
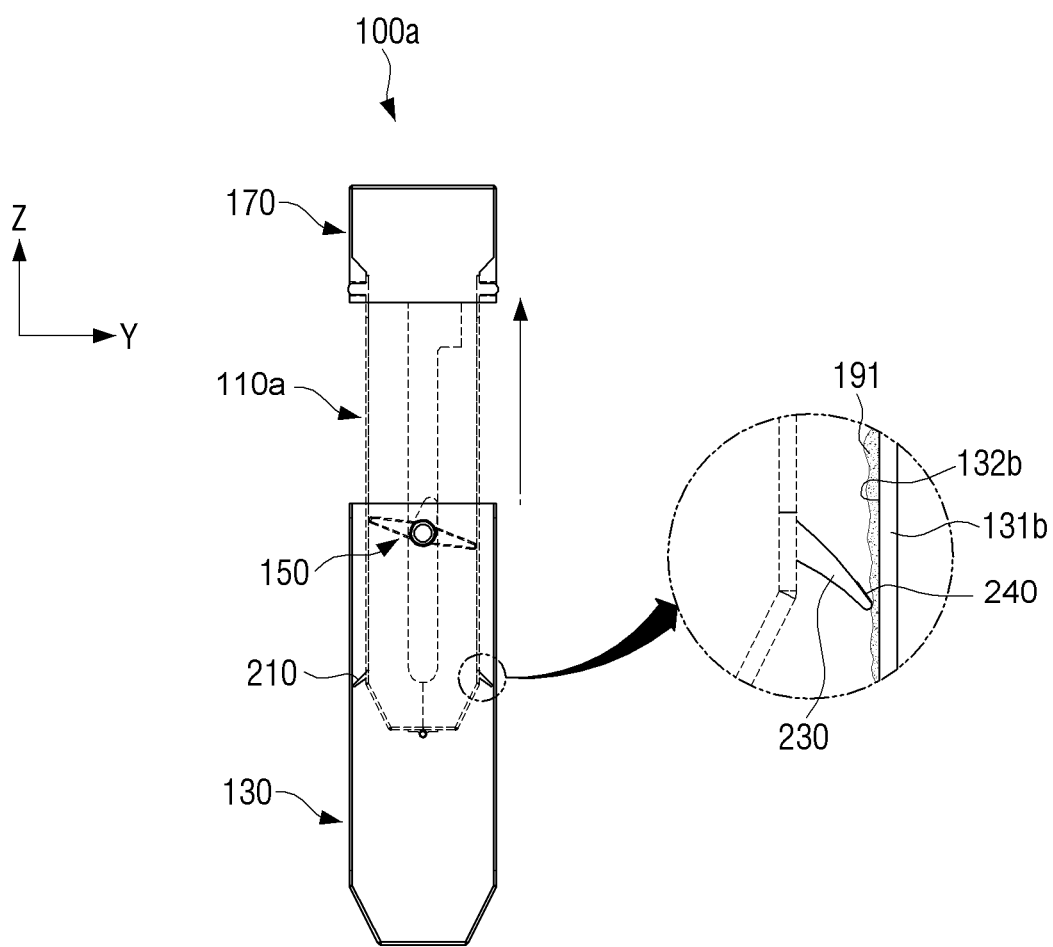
FIG. 7A is a diagram sequentially illustrating an example of collecting lint accumulated in a secondary filter by a filter assembly according to another embodiment of the disclosure.
Figure 7B:
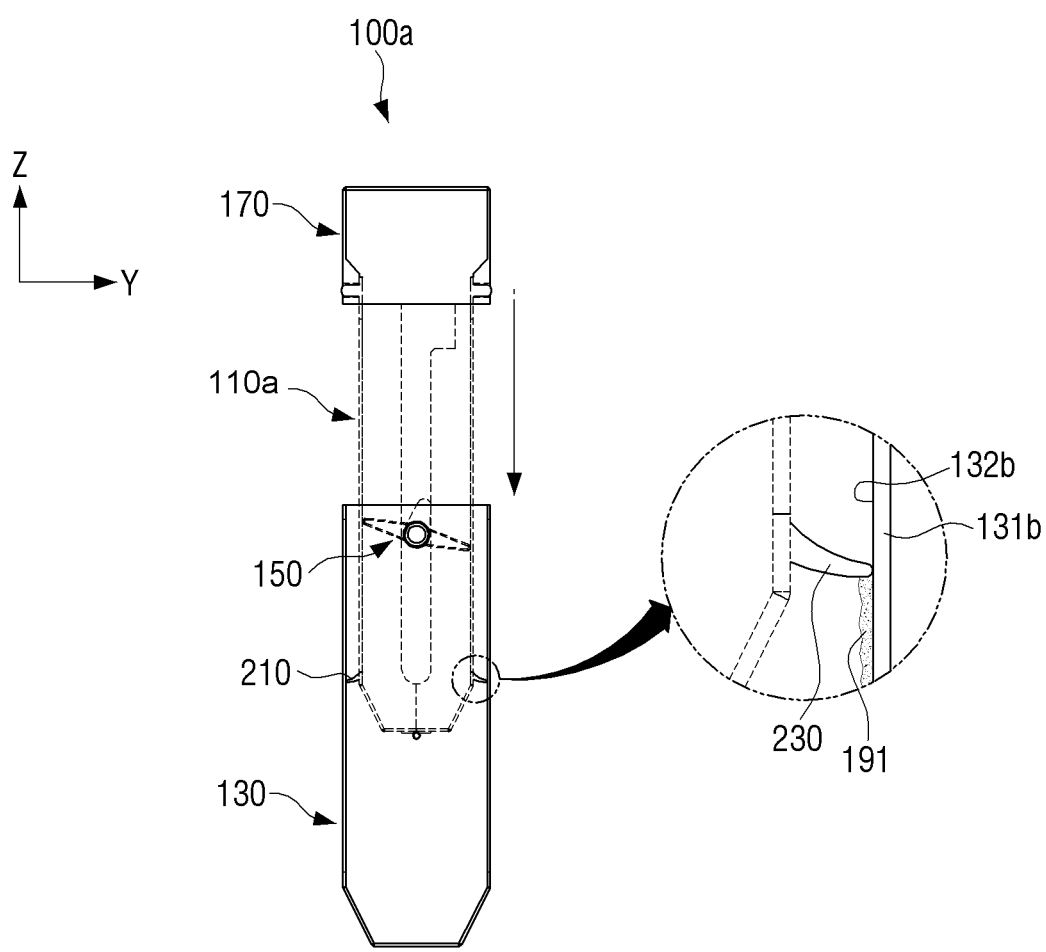
FIG. 7B is a diagram sequentially illustrating an example of collecting lint accumulated in a secondary filter by a filter assembly according to another embodiment of the disclosure.
Figure 7C:
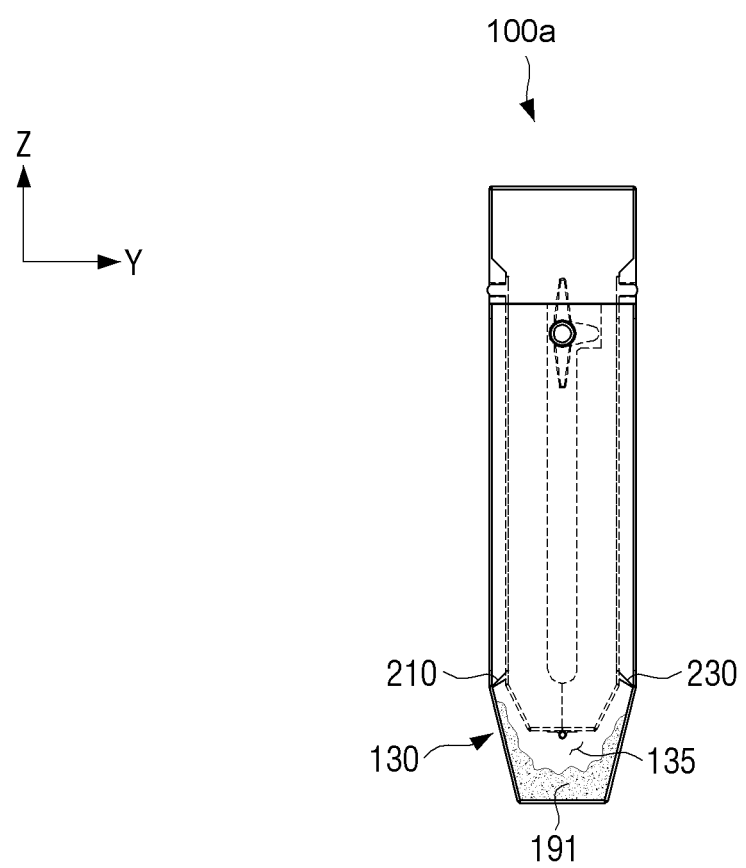
FIG. 7C is a diagram sequentially illustrating an example of collecting lint accumulated in a secondary filter by a filter assembly according to another embodiment of the disclosure.

FIG. 6 is a cross-sectional view illustrating a filter assembly 100a according to another embodiment of the disclosure, and FIGS. 7A to 7C are diagrams sequentially illustrating an example of collecting the lint collected in a secondary filter 130 by a filter assembly 100a according to another embodiment of the disclosure.

The components of the filter assembly 100a according to another embodiment of the disclosure are mostly identical to the components of the aforementioned filter assembly 100. Thus, for the same components as those of the aforementioned filter assembly 100, the same reference numerals will be given, and explanation in that regard will be omitted.

Referring to FIG. 6, on the filter assembly 100a, a pair of sub blades 210, 230 may be arranged along the front surface and the rear surface in the lower part of the primary filter 110a.

The pair of sub blades 210, 230 may be formed to have a width which allows each end part to contact the inner side surfaces 132a, 132b of the pair of second meshes 131a, 131b of the secondary filter 130.

The pair of sub blades 210, 230 may be arranged to be tilted downwardly at a predetermined angle from the primary filter 110a toward the secondary filter 130. This is an arrangement considered such that the lint collected in the pair of second meshes 131a, 131b of the secondary filter 130 are not removed when the primary filter 110a is moved in the direction of being drawn out from the secondary filter 130 (the +Z axis direction), and in contrast, when the primary filter 110a is moved in the direction of being inserted into the secondary filter 130 (the −Z axis direction), the lint collected in the pair of second meshes 131a, 131b of the secondary filter 130 can be scraped off.

The pair of sub blades 210, 230 may be formed of a rubber material or synthetic resin to have elasticity and frictional force like the aforementioned pair of main blades. Accordingly, the pair of sub blades 210, 230 may respectively be bent to a certain extent in opposite directions when the primary filter 110a is moved in the ±Z axis directions, as in FIGS. 7A and 7B.

Referring to FIG. 7A, the pair of sub blades 210, 230 may form a smooth coating layer 240 such that frictional force on the top surface of each end part can be reduced. This may increase the probability that the pair of sub blades 210, 230 do not remove the lint collected in the pair of second meshes 131a, 131b of the secondary filter 130 by each end part when the primary filter 110a is moved in the direction of being separated from the secondary filter 130.

Referring to FIG. 7B, each end part of the pair of sub blades 210, 230 may be bent to some extent when the primary filter 110a is moved in the direction of being inserted into the secondary filter 130, and may thereby scrape off the lint 191 collected while being adhered on the inner side surfaces 132a, 132b of the pair of second meshes 131a, 131b effectively.

Referring to FIG. 7C, the lint 191 separated from the inner side surfaces 132a, 132b of the pair of second meshes 131a, 131b by the pair of sub blades 210, 230 may be collected in the lower space 135 of the secondary filter 130.

Figure 8:
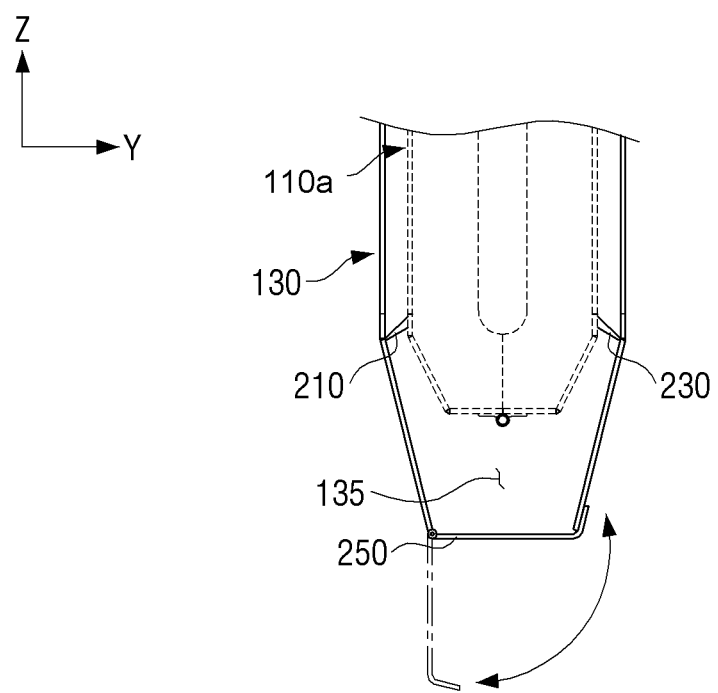
FIG. 8 is a cross-sectional view illustrating an example wherein a filter assembly includes a discharge door for discharging lint collected in a secondary filter according to another embodiment of the disclosure.

Referring to FIG. 8, it is obviously possible that the secondary filter 130 includes a discharge door 250 which can open the lower space 135 on the lower end, for discharging the lint 191 collected in the lower space 135 effectively. In this case, one side of the discharge door 250 may be hinge coupled to the secondary filter 130, and the other side may have a general snap coupling structure to the secondary filter 130.

As described above, the disclosure provides a filter assembly 100 which includes a primary filter 110a, a secondary filter 130 into which the primary filter is separably or detachably inserted, a case 170 which is separably or detachably attached to the opening of the primary filter and wherein a plurality of air inlet holes are formed, and a compression member 150 of which both ends are rotatably coupled to the secondary filter, and which compresses foreign substances (e.g., lint separated from clothes when drying clothes) collected in the primary filter to the lower side inside the primary filter when the primary filter is moved in a first direction of being separated from the secondary filter, and accordingly, the disclosure compresses the lint 190 collected in the filter assembly 100 to one side inside the filter assembly 100 with a simple operation of slide-moving the primary filter 110a while not separating the filter assembly 100 from the dryer 10, and can thereby maintain the ventilation performance of the filter assembly 100 to be good, and prevent deterioration of the filtering performance. By applying the filter assembly 100 according to the disclosure as described above to the dryer 10, deterioration of the performance of the dryer 10 can be prevented, and the number of times of discharge of the lint 190 collected in the filter assembly 100 can be minimized, and the filter assembly 100 can be cleaned easily by compressing the collected lint 190.

In this case, as the primary filter 110a moves in the first direction, the compression member 150 may be changed from the first position wherein its both ends are not in contact with the inner side of the primary filter 110a to the second position wherein its both ends are in contact with the inner side of the primary filter 110a, and may be changed to the first position again as the primary filter 110a moves along the second direction which is a reverse direction of the first direction and returns to its original position.

The compression member 150 may include a pair of main blades 153, 155 that contact both surfaces inside the primary filter 110a in the second position, and an operation projection 156 that rotates in a direction by a tier 116 formed in one of a pair of guide grooves 114a, 114b formed along the longitudinal direction on both sides such that the primary filter 110a does not get in contact with the compression member 150 when the primary filter 110a moves in the first and second directions. Also, the compression member 150 may maintain the second position as its one side is supported by the guide groove 114a when the operation projection 156 is inserted into one guide groove 114a between the pair of guide grooves.

In addition, the compression member 150 may include a rotation center axis 151, first and second blades 153, 155 that are extensively formed along the longitudinal direction of the rotation center axis, and an operation projection 156 that projects in a different direction from the first and second blades on one side of the rotation center axis. In this case, the first and second blades 153, 155 may be arranged symmetrically with the rotation center axis 151 as the center, or arranged in parallel with each other. Also, the operation projection 156 may project in an approximately orthogonal direction with respect to the first and second blades.

The gravity center of the pair of main blades 153, 155 may be deviated to the side of one blade 153 between the pair of main blades such that their position is changed from the second position to the first position by the weight of themselves. For such deviation of the weight, a weight 154 may be buried in the inner side of the blade 153 located in the lower side in the first position between the pair of main blades 153, 155 such that it has a bigger weight than the blade 155 located on the upper side. Also, the pair of main blades 153, 155 may be formed of a rubber material or synthetic resin having elasticity such that they can have predetermined elasticity.

The primary filters 110a may be respectively formed on both sides in the lower part along the width direction of the primary filters 110a, and the filter assembly may further include a pair of sub blades 210, 230 that are in contact with both side surfaces inside the secondary filter so as to scrape off foreign substances (lint) collected in the secondary filter when the primary filter 110a is moved in the second direction. The pair of sub blades 210, 230 may be formed of a rubber material or synthetic resin having elasticity so that they can be bent when the primary filter is moved in the first direction. In this case, on the pair of sub blades 210, 230, a coating layer 250 for preventing friction between the top surface of each sub blade and lint collected in the secondary filter may be formed. It is preferable that the coating layer 250 is formed of a substance having low frictional force.

In the secondary filter 130, a lower space 135 may be provided such that foreign substances (lint) collected in the secondary filter can be stored through the pair of sub blades 210, 230. Also, the secondary filter 130 may include a discharge door 250 for discharging foreign substances (lint) collected in the lower part 135 easily.

In addition, the filter assembly 100 according to the disclosure may be configured to include a primary filter 110a which filters air introduced into an opening on one side and discharged to both side surfaces, a secondary filter 130 to which the primary filter is slidably coupled in a first direction and a second direction which is an opposite direction of the first direction, and which filters air introduced from the primary filter and discharged to both side surfaces, and a compression member 150 which rotates in one direction as a portion of the primary filter is pushed by an operation of the primary filter of moving in the first direction and scrapes off foreign substances collected on both side surfaces of the primary filter and compresses them to the other side of the primary filter. In this case, the compression member 150 may rotate in a reverse direction as push of a portion by the primary filter is released when the primary filter moves in the second direction and returns to its original position and may get in a non-contact state with both side surfaces of the primary filter. Also, the primary filter 110a may further include a pair of sub blades 210, 230 attached on both side surfaces, and the pair of sub blades may scrape off foreign substances collected on both side surfaces of the secondary filter and collect them on the other side of the secondary filter when the primary filter moves in the second direction.

In addition, the disclosure may provide a dryer including the aforementioned filter assembly 100, and a main body 11 including a drum 30 arranged on the inner side, a slot 40 for putting clothes inside the drum, and a door 50 closing and opening the slot. In this case, the filter assembly 100 may be separably or detachably installed on the slot 40 and filter foreign substances (lint) included in air discharged from the inside of the drum.

While embodiments have been described above, it will be understood by those of ordinary skill in the art that various changes in form and details may be made therein without departing from the spirit and scope of the disclosure as defined by the following claims.

What is claimed is:

1. A filter assembly comprising:
   a primary filter;
   a secondary filter into which the primary filter is detachably inserted;
   a case detachably coupled to the primary filter and comprising a plurality of air inlet holes; and
   at least one blade being rotatably coupled to the secondary filter and configured to compresses first foreign substances collected in the primary filter based on the primary filter moving in a first direction in which the primary filter is drawn out from the secondary filter.

2. The filter assembly of claim 1, wherein the at least one blade is changed from a first position to a second position as the primary filter moves in the first direction, and is changed back to the first position from the second position as the primary filter moves in a second direction opposite to the first direction, the at least one blade not being in contact with an inner side of the primary filter at the first position and being in contact with the inner side of the primary filter at the second position.

3. The filter assembly of claim 2, wherein the primary filter comprises:
   a pair of guide grooves extending in the second direction and provided at opposite axial ends of the at least one blade, the pair of guide grooves not interfering with the at least one blade while the at least one blade moves in the first direction or the second direction; and
   a tier formed on one of the pair of guide grooves; and
   the at least one blade comprises:
   a pair of main blades in contact with a first surface of the primary filter and a second surface opposite to the first surface of the primary filter when the at least one blade is in the second position; and
   an operation projection configured to rotate in one direction by the tier formed on the one of the pair of guide grooves by movement of the primary filter.

4. The filter assembly of claim 3, wherein the at least one blade is configured to maintain the second position by one side of the operation projection being supported by the one of the pair of guide grooves based on the operation projection being inserted into the pair of guide grooves.

5. The filter assembly of claim 3, wherein a center of gravity of the at least one blade is deviated to one blade of the pair of main blades such that a position of the at least one blade is changed from the second position to the first position.

6. The filter assembly of claim 5, wherein the one blade of the pair of main blades comprises a weight being embedded in the one blade of the pair of main blades.

7. The filter assembly of claim 3, wherein the pair of main blades comprises a rubber material or synthetic resin having elasticity.

8. The filter assembly of claim 2, wherein the primary filter further comprises a pair of sub blades being in contact with a first side surface and a second side surface of the secondary filter and configured to scrape off second foreign substances collected in the secondary filter based on the primary filter moving in the second direction.

9. The filter assembly of claim 8, wherein the pair of sub blades comprises a rubber material or synthetic resin having elasticity.

10. The filter assembly of claim 9, wherein a top surface of each of the pair of sub blades comprises a coating layer configured to prevent friction between the pair of sub blades and the secondary filter.

11. The filter assembly of claim 8, wherein the secondary filter comprises a lower space configured to collect the second foreign substances.

12. The filter assembly of claim 11, wherein the secondary filter further comprises a discharge door configured to discharge foreign substances collected in the lower space.

13. The filter assembly of claim 1, wherein the at least one blade comprises:
 a rotation center axis;
 a first blade and a second blade extending along the rotation center axis; and
 an operation projection protruding in a different direction from extending directions of the first blade and the second blade from the rotation center axis.

14. The filter assembly of claim 13, wherein the first blade and the second blade are arranged symmetrically with respect to the rotation center axis.

15. The filter assembly of claim 13, wherein the first blade and the second blade are arranged in parallel with each other.

16. The filter assembly of claim 15, wherein the operation projection protrudes in an orthogonal direction with respect to the first blade and the second blade.

17. A filter assembly comprising:
 a primary filter configured to filter air introduced into an opening and discharged to a first side surface and a second side surface of the primary filter;
 a secondary filter to which the primary filter is slidably coupled in a first direction and from which the primary filter is slidably uncoupled in a second direction opposite to the first direction, the secondary filter configured to filter air introduced from the primary filter and discharged to a first side surface and a second side surface of the secondary filter; and
 at least one blade configured to rotate in a first rotation direction as the primary filter moves in the second direction and scrape off first foreign substances collected on the first side surface and the second side surface of the primary filter and compresses the first foreign substances.

18. The filter assembly of claim 17, wherein the at least one blade is configured to rotate in a second rotation direction opposite to the first rotation direction as the primary filter moves in the first direction.

19. The filter assembly of claim 17, further comprising a pair of sub blades attached on the first side surface and the second side surface of the primary filter,
 wherein the pair of sub blades are configured to scrape off second foreign substances collected on the first side surface and the second side surface of the secondary filter and collect the second foreign substances based on the primary filter moving in the first direction.

20. A dryer comprising:
 a main body comprising:
  a drum;
  a slot for putting objects inside the drum; and
  a door for the slot; and
 the filter assembly of claim 1 which is detachably installed on the slot and configured to filter the first foreign substances included in air discharged from the drum.

* * * * *